United States Patent
Kovach

(10) Patent No.: US 11,219,153 B2
(45) Date of Patent: Jan. 11, 2022

(54) SYSTEM AND METHOD FOR MONITORING SHANK FLOAT

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 201 days.

(21) Appl. No.: 16/555,398

(22) Filed: Aug. 29, 2019

(65) Prior Publication Data

US 2021/0059098 A1     Mar. 4, 2021

(51) Int. Cl.
| | |
|---|---|
| *A01B 71/02* | (2006.01) |
| *A01B 15/02* | (2006.01) |
| *A01B 35/24* | (2006.01) |
| *A01B 49/04* | (2006.01) |

(52) U.S. Cl.
CPC .............. *A01B 71/02* (2013.01); *A01B 15/02* (2013.01); *A01B 35/24* (2013.01); *A01B 49/04* (2013.01)

(58) Field of Classification Search
CPC ......... A01B 71/02; A01B 15/02; A01B 35/24; A01B 49/04; A01B 79/005; A01B 63/111; A01B 63/114; A01B 61/046
See application file for complete search history.

(56) References Cited

U.S. PATENT DOCUMENTS

| | | | |
|---|---|---|---|
| 4,508,178 A | 4/1985 | Cowell et al. | |
| 5,255,756 A | 10/1993 | Follmer et al. | |
| 5,499,684 A | 3/1996 | Stratton | |
| 6,073,070 A | 6/2000 | Diekhans | |
| 6,608,672 B1 | 8/2003 | Shibusawa et al. | |
| 7,490,678 B2 | 2/2009 | Unruh et al. | |
| 7,580,783 B2 | 8/2009 | Dix | |
| 8,090,507 B2 | 1/2012 | Yegerlehner et al. | |
| 8,352,131 B2 | 1/2013 | Yegerlehner et al. | |
| 8,544,397 B2 * | 10/2013 | Bassett | ................. A01B 63/111 111/167 |
| 8,565,984 B2 | 10/2013 | Mayfield et al. | |
| 8,738,244 B2 | 5/2014 | Lenz et al. | |
| 8,763,713 B2 * | 7/2014 | Bassett | .................... A01C 5/06 172/2 |
| 9,085,261 B2 | 7/2015 | Lu et al. | |
| 9,433,142 B2 * | 9/2016 | Bergen | ..................... A01C 5/06 |
| 9,446,713 B2 | 9/2016 | Lu et al. | |
| 9,585,301 B1 * | 3/2017 | Lund | .................... G01N 27/223 |
| 10,537,055 B2 * | 1/2020 | Gresch | ................... A01C 7/203 |

(Continued)

*Primary Examiner* — Jessica H Lutz

(74) *Attorney, Agent, or Firm* — Rebecca L. Henkel; Rickard K. DeMille

(57) ABSTRACT

A shank assembly for an agricultural tillage implement including a support arm, a shank connected to the support arm, a point connected to the shank, and a float monitoring system. The float monitoring system includes a first sensor for sensing a home position, a second sensor connected to the support arm and configured for sensing an angular position of the support arm relative to the frame of the agricultural tillage implement, and an electronic control unit operably connected to the first sensor and the second sensor. The electronic control unit is configured for comparing the home position and the angular position of the support arm and determining a float of the shank as the shank is towed in a forward direction of travel.

16 Claims, 4 Drawing Sheets

(56) References Cited

U.S. PATENT DOCUMENTS

| | | | |
|---|---|---|---|
| 10,645,865 B2* | 5/2020 | Bassett | A01C 7/205 |
| 10,701,862 B2* | 7/2020 | Thomson | A01D 41/145 |
| 10,757,854 B2* | 9/2020 | Stanhope | A01B 76/00 |
| 2007/0239338 A1* | 10/2007 | Potts | E01C 19/288 |
| | | | 701/50 |
| 2009/0187315 A1* | 7/2009 | Yegerlehner | A01B 63/1117 |
| | | | 701/50 |
| 2009/0301367 A1* | 12/2009 | Martin | A01C 5/064 |
| | | | 111/139 |
| 2010/0300711 A1* | 12/2010 | Pirotais | A01B 63/1145 |
| | | | 172/10 |
| 2013/0081829 A1* | 4/2013 | Tuttle | A01B 73/044 |
| | | | 172/1 |
| 2013/0081830 A1* | 4/2013 | Tuttle | A01B 63/16 |
| | | | 172/1 |
| 2013/0180742 A1* | 7/2013 | Wendte | A01B 63/1145 |
| | | | 172/4 |
| 2013/0248212 A1* | 9/2013 | Bassett | A01C 7/205 |
| | | | 172/4 |
| 2014/0251647 A1* | 9/2014 | Isaacson | A01C 7/205 |
| | | | 172/2 |
| 2015/0201547 A1* | 7/2015 | Gschwendtner | F16H 61/4043 |
| | | | 172/7 |
| 2015/0264857 A1* | 9/2015 | Achen | A01B 49/06 |
| | | | 111/149 |
| 2016/0143209 A1* | 5/2016 | Jagow | A01B 63/145 |
| | | | 172/1 |
| 2016/0157411 A1* | 6/2016 | Lysaght | A01B 39/18 |
| | | | 172/1 |
| 2016/0165789 A1* | 6/2016 | Gervais | A01C 7/205 |
| | | | 700/275 |
| 2017/0196160 A1* | 7/2017 | Bjerketvedt | A01B 61/042 |
| 2018/0014449 A1* | 1/2018 | Dillon | A01B 35/16 |
| 2018/0054953 A1* | 3/2018 | Martin | A01B 27/005 |
| 2018/0092287 A1* | 4/2018 | Garner | A01C 7/084 |
| 2018/0303022 A1* | 10/2018 | Barrick | A01B 35/32 |
| 2018/0310465 A1* | 11/2018 | Peterson | A01B 63/008 |
| 2018/0310466 A1* | 11/2018 | Kovach | A01B 19/02 |
| 2018/0368307 A1* | 12/2018 | Honey | A01B 33/024 |
| 2019/0000005 A1* | 1/2019 | Barrick | A01B 63/22 |
| 2019/0124824 A1* | 5/2019 | Hubner | A01C 5/064 |
| 2019/0373797 A1* | 12/2019 | Schoeny | A01C 7/203 |
| 2020/0077585 A1* | 3/2020 | Garbald | A01B 63/008 |
| 2020/0093052 A1* | 3/2020 | Preimess | A01B 63/111 |
| 2020/0154627 A1* | 5/2020 | Plattner | A01C 5/064 |
| 2020/0178454 A1* | 6/2020 | Knobloch | A01B 79/005 |
| 2020/0260631 A1* | 8/2020 | Glennon | A01B 63/008 |

* cited by examiner

SYSTEM AND METHOD FOR MONITORING SHANK FLOAT

BACKGROUND OF THE INVENTION

The present invention pertains to agricultural tillage implements and, more specifically, to a system for monitoring a ground engaging tool float of an agricultural tillage implement.

Farmers utilize a wide variety of tillage implements to prepare soil for planting. Tillage implements prepare the soil by way of mechanical agitation of numerous types, such as digging, stirring, and overturning. Examples of tillage include plowing (overturning with moldboards or chiseling with chisel shanks), disking, harrowing, sweeping, and cultivating with cultivator shanks. Tillage implements are often classified into two types: vertical or horizontal tillage. Generally, vertical tillage is performed with implements such as coulters or spider wheels. Horizontal tillage, on the other hand, is performed with implements such as sweeps. The employment of vertical and/or horizontal tillage depends upon various aspects of a given situation including soil conditions, equipment, crops to be planted, etc.

Some tillage implements may include two or more sections coupled together to perform multiple functions as they are pulled through fields by an agricultural vehicle. For example, a field cultivator is capable of simultaneously tilling soil and leveling the tilled soil in preparation for planting. Field cultivators convert compacted soil into a level seedbed with a consistent depth for providing optimal conditions for planting of a crop. Residual crop material, weeds, or other undesired plants disposed on top of the soil are destroyed and worked into the soil. A typical field cultivator generally includes a frame that carries a number of ground-engaging tools for working the soil. The tools may include shovels, knives, points, sweeps, coulters, spikes, or plows. A field cultivator may include shank assemblies, which each include a respective shank and point attached thereto, for creating a level seedbed to facilitate optimal seed growth. Some field cultivators may also include rear auxiliary tools to perform various secondary tasks for finishing the soil. For example, a field cultivator may also include a spike tooth harrow, spring tooth harrow, rolling (aka. crumbler) basket, etc., or any combination thereof for finishing the soil.

During operation of the field cultivator, the shanks, and the points attached thereto, may begin to float out of their designated operating depth as the field cultivator is pulled in a forward direction of travel. For instance, if the shanks encounter harder soil, the force acting against the shanks may cause the shanks to float or rotate rearwardly and upwardly to a shallower depth. As can be appreciated, the flotation of the shanks may negatively affect crop yield because the varying depth of the points on the shanks creates an uneven seedbed. Unless an operator is visually monitoring the shanks, the operator may not be made aware of the flotation thereof. Thereby, the operator may not make the appropriate adjustments to the towing vehicle or field cultivator in order to mitigate shank float.

What is needed in the art is a cost-effective monitoring system for monitoring the shank float of each shank assembly on an agricultural tillage implement.

SUMMARY OF THE INVENTION

In one exemplary embodiment formed in accordance with the present invention, there is provided a shank assembly for an agricultural tillage implement which generally includes a support arm, a shank, a point, and a float monitoring system. The float monitoring system includes two inclinometer sensors, which are respectively connected to the frame of the agricultural implement and the support arm of the shank, and a controller operably connected to the sensors. The controller compares the incline signals and determines a float of the shank by estimating a depth of the shank and/or point from the angular rotation of the support arm relative to the frame.

In another exemplary embodiment formed in accordance with the present invention, there is provided a shank assembly for an agricultural tillage implement having a frame. The shank assembly includes a support arm comprising a first end and a second end, the first end is configured for pivotally connecting to the frame, a shank comprising a first end and a second end, the first end of the shank is connected to the second end of the support arm, a point connected to the second end of the shank and configured for engaging with soil, and a float monitoring system. The float monitoring system includes a first sensor configured for being connected to the frame and sensing a home position, a second sensor connected to the support arm and configured for sensing an angular position of the support arm relative to the frame, and an electronic control unit operably connected to the first sensor and the second sensor. The electronic control unit is configured for comparing the home position and the angular position of the support arm and determining a float of the shank as the shank is towed in a forward direction of travel.

In yet another exemplary embodiment formed in accordance with the present invention, there is provided an agricultural tillage implement for an agricultural vehicle. The agricultural tillage implement includes a frame and at least one shank assembly connected to the frame. Each shank assembly includes a support arm comprising a first end and a second end, the first end is pivotally connected to the frame, a shank comprising a first end and a second end, the first end of the shank is connected to the second end of the support arm, and a point connected to the second end of the shank and configured for engaging with soil. The agricultural tillage implement also includes a float monitoring system. The float monitoring system includes a first sensor connected to the frame for sensing a home position, a second sensor connected to the support arm of the at least one shank assembly and configured for sensing an angular position of the support arm relative to the frame, and an electronic control unit operably connected to the first sensor and the second sensor. The electronic control unit is configured for comparing the home position and the angular position of the support arm and determining a float of the shank as the shank is towed in a forward direction of travel.

In yet another exemplary embodiment formed in accordance with the present invention, there is provided a method of operating an agricultural tillage implement. The method includes an initial step of providing a shank assembly for the agricultural tillage implement. The shank assembly includes a support arm comprising a first end and a second end, the first end is configured for pivotally connecting to the frame, a shank comprising a first end and a second end, the first end of the shank is connected to the second end of the support arm, a point connected to the second end of the shank and configured for engaging with soil, and a float monitoring system. The float monitoring system includes a first sensor configured for being connected to the frame, a second sensor connected to the support arm, and an electronic control unit operably connected to the first sensor and the second sensor. The method further includes the steps of sensing, by the first sensor, a home position of the frame and sensing, by the second sensor, an angular position of the support arm relative to the frame. The method also includes the steps of comparing, by the electronic control unit, the home position and the angular position of the support arm, and determining, by the electronic control unit, a float of the shank as the shank is towed in a forward direction of travel.

One possible advantage of the exemplary embodiment of the float monitoring system is that the float of the shanks of the shank assemblies is accurately determined and efficiently communicated to the operator of the agricultural tillage implement.

Another possible advantage of the exemplary embodiment of the float monitoring system is that the agricultural tillage implement may readily adjust various operating parameters in response to the float sensed by the float monitoring system so that a consistent and level seedbed is formed and/or soil compaction is reduced throughout the field.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "forward", "rearward", "left" and "right", when used in connection with the agricultural tillage implement and/or components thereof are usually determined with reference to the direction of forward operative travel of the agricultural vehicle, but they should not be construed as limiting. The terms "longitudinal" and "transverse" are determined with reference to the fore-and-aft direction of the agricultural tillage implement and are equally not to be construed as limiting.

Figure 1:
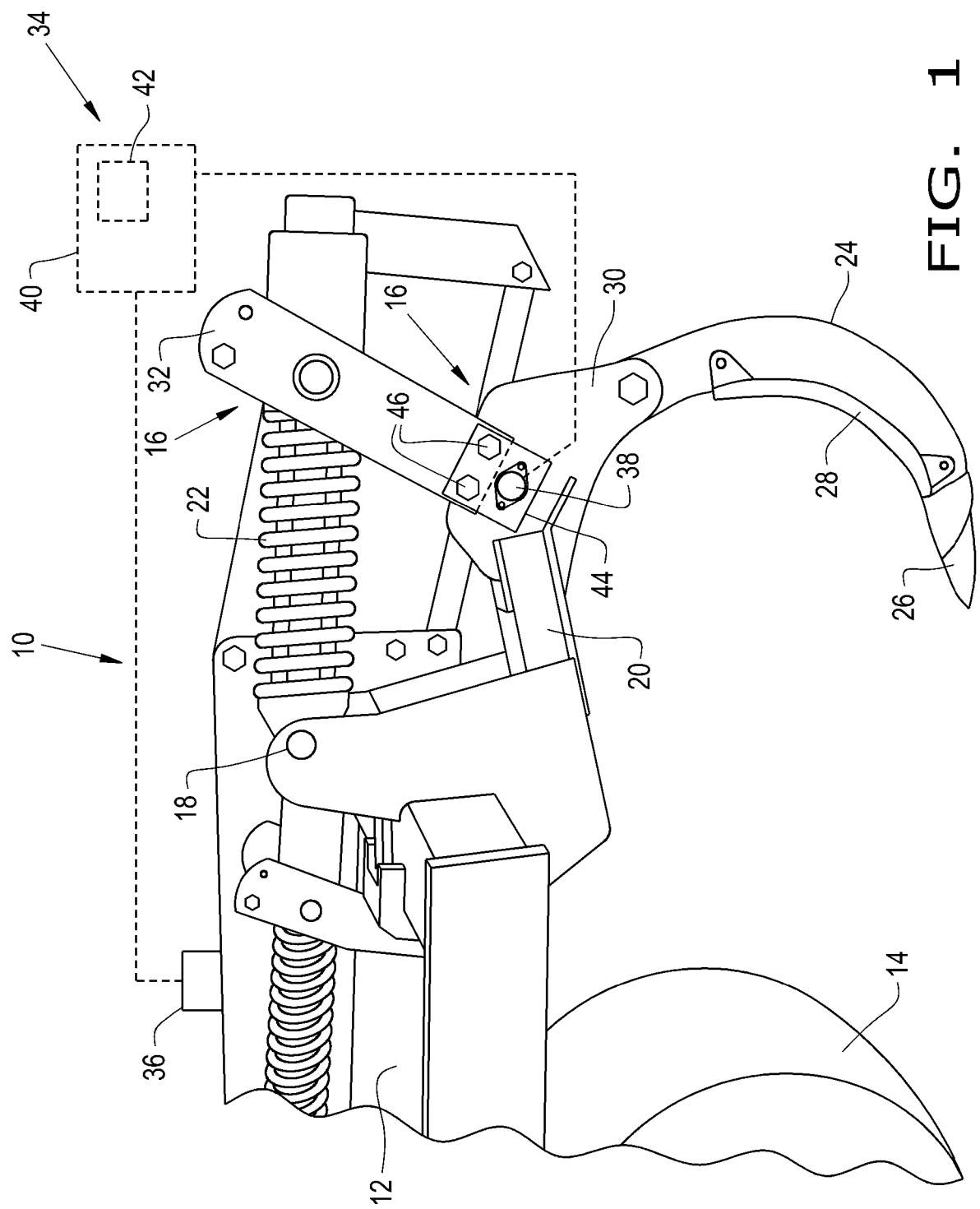
FIG. 1 illustrates a perspective view of an exemplary embodiment of an agricultural tillage implement that includes multiple shank assemblies which each include a float monitoring system, and each shank assembly is in a home position, in accordance with an exemplary embodiment of the present invention.
Figure 2:
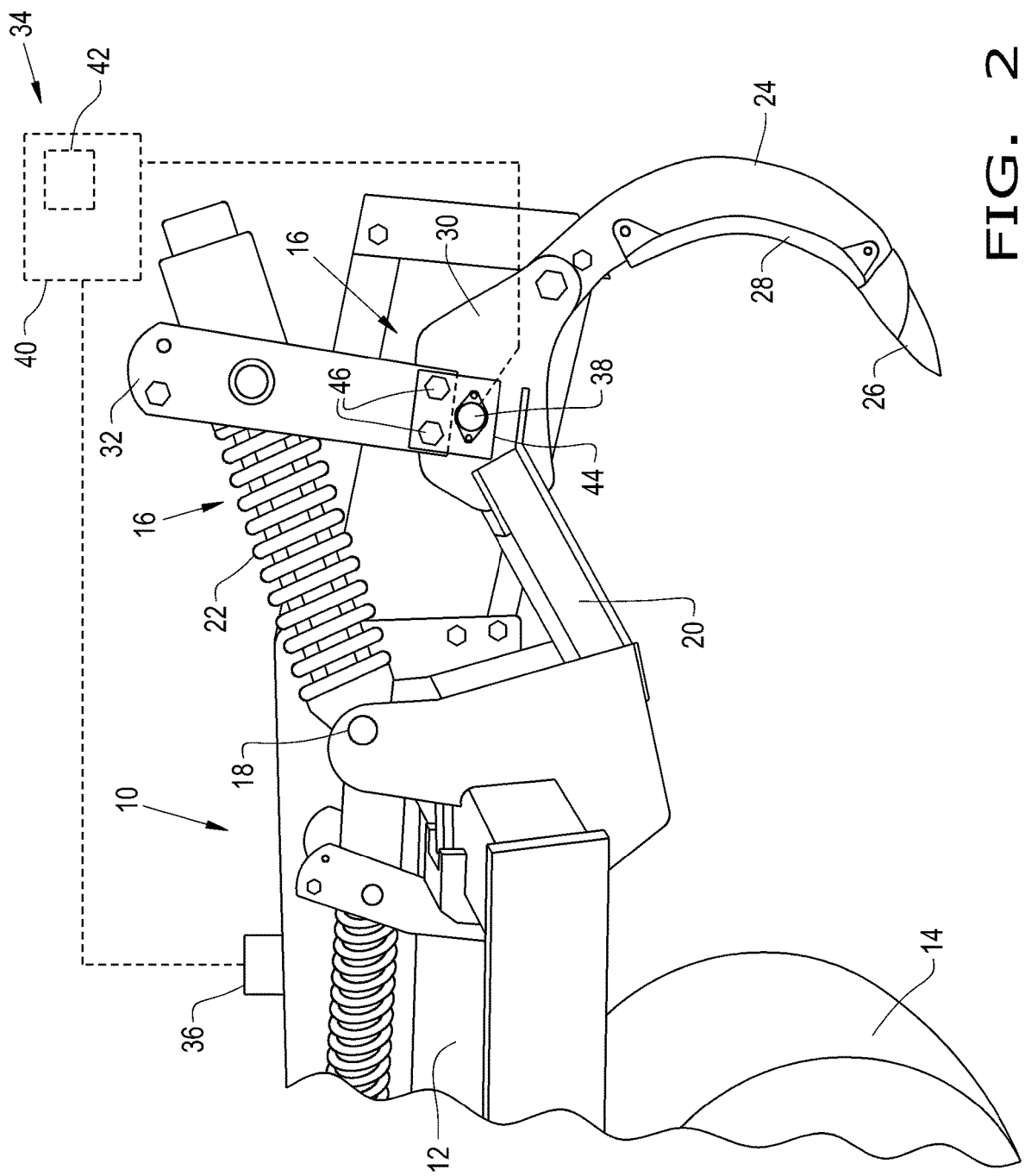
FIG. 2 illustrates another perspective view of the agricultural tillage implement of FIG. 1, wherein each shank assembly is in a partially raised or tripped position.
Figure 3:
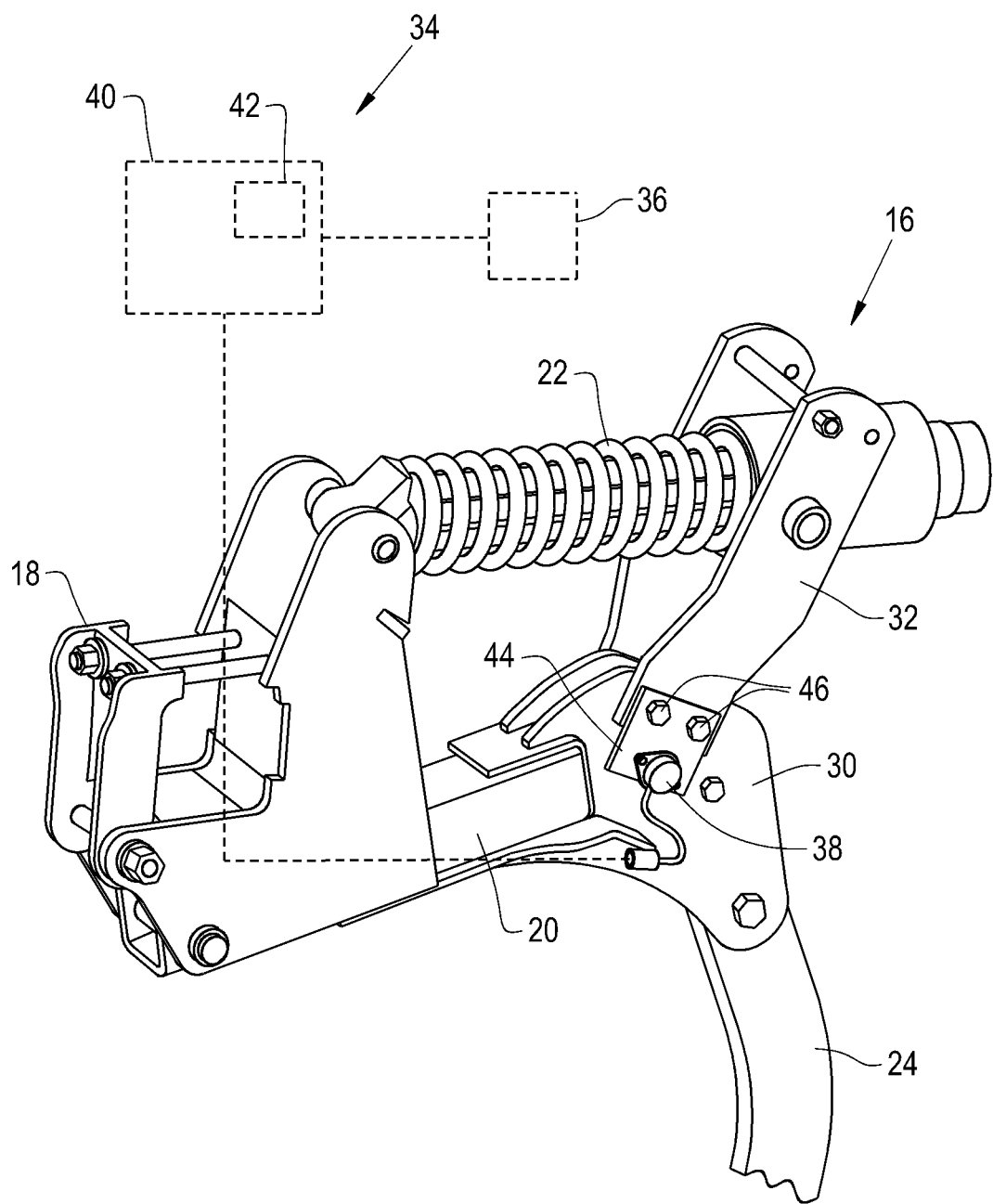
FIG. 3 illustrates a perspective view of a shank assembly as shown in FIGS. 1-2.

Referring now to the drawings, and more particularly to FIGS. 1-3, there is shown an agricultural tillage implement 10 that generally includes a frame 12, wheels 14 supporting the frame 12, and various ground engaging tools including primary and/or secondary tools, such as shank assemblies 16, which are mounted to the frame 12. The agricultural tillage implement 10 may be in the form of any desired ground-engaging implement, such as a chisel plow, a field cultivator, or disk ripper. As can be appreciated the agricultural tillage implement 10 may also include other ground engaging tools such as such as a ganged disk harrow, spike tooth harrow, leveling blades, and/or rolling, i.e., crumbler, basket assemblies for finishing the soil. The agricultural tillage implement 10 may be towed by any desired work vehicle, such as a tractor.

The frame 12 may be a single body frame or it may be a multi-section frame with one or more wing sections. In addition to supporting the ground engaging tools, the frame 12 may also support hydraulic and electrical systems which can adjust down pressure and/or fold and unfold the wing sections. For example, the frame 12 may also support one or more actuators for adjusting the depth of the shank assemblies 16. It should be appreciated that the hydraulic and electrical systems of the agricultural tillage implement 10 may be controlled by a user via data transmitted to the agricultural vehicle via an ISOBUS connection. The frame 12 may comprise any desired material, such as metal.

The shank assemblies 16 are configured for engaging the soil. Each shank assembly 16 is connected to and supported by the frame 12. Each shank assembly 16 generally includes a frame mount 18, a support arm 20 rotatably connected to the frame 12 via the frame mount 18, a compression spring 22, a shank 24, a sweep or point 26, and a protective guard 28 coupled to the shank 24. The frame mount 18 may at least partially wrap around the frame 12 and may be fixedly attached to the frame 12 by one or more fasteners. The frame mount 18 may include a shank stop that is affixed, e.g. welded, on the bottom side of the plates of the frame mount 18 (unnumbered). The support arm 20 has a first end which is rotatably connected to the frame mount 18 and a second end with a curved, shank mounting bracket 30 which mounts the shank 24. It should be appreciated that the mounting bracket 30 may be a separate piece attached, e.g. welded or bolted, to the second end of the support arm 20 or integrally formed as part of the second end of the support arm 20. The compression spring 22 has a first end rotatably connected to the frame mount 18 and a second end rotatably connected to a spring mounting bracket 32, which in turn is connected to the mounting bracket 30. The compression spring 22 may also include a pivot casting and retaining bolt assembly (unnumbered). The compression spring 22 may be in the form of any desired biasing member. The shank 24 and point 26, which may be removably attached thereto, may be in the form of any desired shank and point, respectively.

As can be appreciated, the shanks 24 of the shank assemblies 16 are designed to "trip" or break away upon contacting an object, e.g. an immovable rock. Hence, the shanks 24 may rotate upwardly from a home position (FIG. 1), wherein the shanks 24 are fully engaged with the soil at a desired depth, to a tripped position, wherein the shanks 24 are at least partially rotated upwardly above their home position operating depth. Also, the shanks 24 may float, i.e., at least partially rotate upwardly, for example when being pulled through hard ground such that the shanks 24 are positioned in a float or partially tripped position (FIG. 2). Accordingly, the shanks 24 may begin to create an undesired effect, e.g. unlevel seedbed or uneven soil compaction, if they remain in the partially tripped position throughout various sections of the field. To reposition the shanks 24 after they have floated out of their home position, the towing vehicle may be decelerated, the down pressure on the frame 12 and/or shanks 24 may be adjusted, and/or the operating depth of the frame 12 and/or shanks 24 may be adjusted.

According to a further aspect of the exemplary embodiment of the present invention, the agricultural implement 10 and/or at least one of the shank assemblies 16 may further include a float monitoring system 34 for monitoring the float of one or more shanks 24. The float monitoring system 34 includes a first, home sensor 36 connected to the frame 12 for sensing a home position of the frame, a second, shank sensor 38 respectively associated with at least one shank 24, and an electronic control unit (ECU) 40, e.g. a controller 40 with a memory 42. The float monitoring system 34 may monitor the angular position of a respective support arm 20, which is indicative of the depth of the shank 24 and point 26 attached thereto. Accordingly, the float monitoring system 34 may monitor the float of each shank 24 and may subsequently notify the operator of the towing vehicle so that one or more operating parameters, e.g. the speed of the towing vehicle, the depth of the shanks 24, etc., may be adjusted. Therefore, the shanks 24 and points 26 can operate at a consistent depth for engaging the soil and eliminating, or at least reducing, soil compaction, or creating a level seedbed.

The home sensor 36 may be connected to the frame 12 at any desired location. Alternatively, the home sensor 36 may be connected to a given frame mount 18. The float monitoring system 34 may include only one shank sensor 38 that is connected to one respective support arm 20 out of the multiple shank assemblies 16 or multiple shank sensors 38 which are connected to a few or all of the support arms 20 of the multiple shank assemblies 16. For example, each shank sensor 38 may be connected to a respective mounting bracket 30 of the support arm 20 via a mounting plate 44. The shank sensor 38 may be fastened to the mounting plate 44, which in turn is mounted onto the mounting bracket 30 by the same fastener(s) 46 which mount the spring mounting bracket 32 onto the mounting bracket 30. Alternatively, each shank sensor 38 may be connected to a respective support arm 20 and/or mounting bracket 30 by way of brackets, plates, fasteners, and/or welding. As shown, the float monitoring system 34 includes only one home sensor 36; however, the float monitoring system 34 may include multiple home sensors 36. Also as shown, the float monitoring system 34 includes only one shank sensor 38 for each shank 24; however, the monitoring system 34 may include multiple shank sensors 38 for each shank 24.

The home sensor 36 senses a home position of the frame 12, i.e., a relative horizontal or zero slope position. Each shank sensor 38 senses an angular position of the support arm 20 relative to the frame 12, i.e., as the support arm 20 rotates relative to the frame 12. As can be appreciated, the initial position of the shanks 24 sensed by the shank sensor 38 in the home position of the shank assemblies 16 need not match or be equal to the home position of the frame 12 sensed by the home sensor 36 (FIG. 1). For instance, the home sensor 36 may sense an approximately zero incline of the frame 12, plus or minus 10 degrees; whereas each shank sensor 38 may sense an initial incline of the respective support arm 20. Thereby, an initial angular relationship may be established between the respective support arm 20 and the frame 12. From these initial sensed starting positions, the sensors 36, 38 may sense any changes in the angles of the frame 12 and/or respective support arm 20 in order to determine how much each shank 24 has floated, e.g. at least partially rotated upwardly from its initial position in the home position of the shank assemblies 16 (FIG. 2). It should be appreciated that the sensors 36, 38 may continually or periodically sense the angular position of the frame 12 and the support arm 20, respectively. The sensors 36, 38 may each be in the form of inclinometer sensors 36, 38. For example, each sensor 36, 38 may be in the form of an electronic inclinometer sensor 36, 38.

The controller 40 may be operably connected to the sensors 36, 38 via a wired and/or wireless connection. The controller 40 compares the incline signals from the sensors 36, 38 and determines the float of a respective shank 24 by extrapolating a depth of the shank 24 from the angular position of the support arm 20 relative the initial position of the support arm 20 and the home position of the frame 12 sensed by the home sensor 36. For instance, a set distance from the support arm 20 to the shank 24 and/or point 26 may be known and stored in the memory 42 such that the as the shank sensor 38 indicates a particular float position of the support arm 20 the controller 40 may extrapolate the depth of the shank 24 and/or point 26 from this spatial relationship. The controller 40 may also be operably connected to any desired control functionality of the towing vehicle and/or agricultural tillage implement 10, e.g. the vehicle speed controller, actuator(s) for controlling the depth of the tillage agricultural implement 10, etc. The controller 40 may be in the form of any desired analog or digital control system or control unit. It should be appreciated that the controller 40 may be coupled with or integrated into the existing hardware and/or software of the agricultural implement 10 and/or towing vehicle.

It is conceivable that the monitoring system 34 may also automatically control the speed of the towing vehicle and/or the depth of the frame 12 and/or shanks 24. For example, as the shanks 24 begin to float, the controller 40 may automatically decelerate the towing vehicle in order to alleviate some of the force acting on the shanks 24 and thereby allow the shanks 24 to return to their desired home position. Additionally, for example, the controller 40 may automatically raise or lower the actuator(s) which control the depth of the frame 12 and/or shank assemblies 16.

Figure 4:
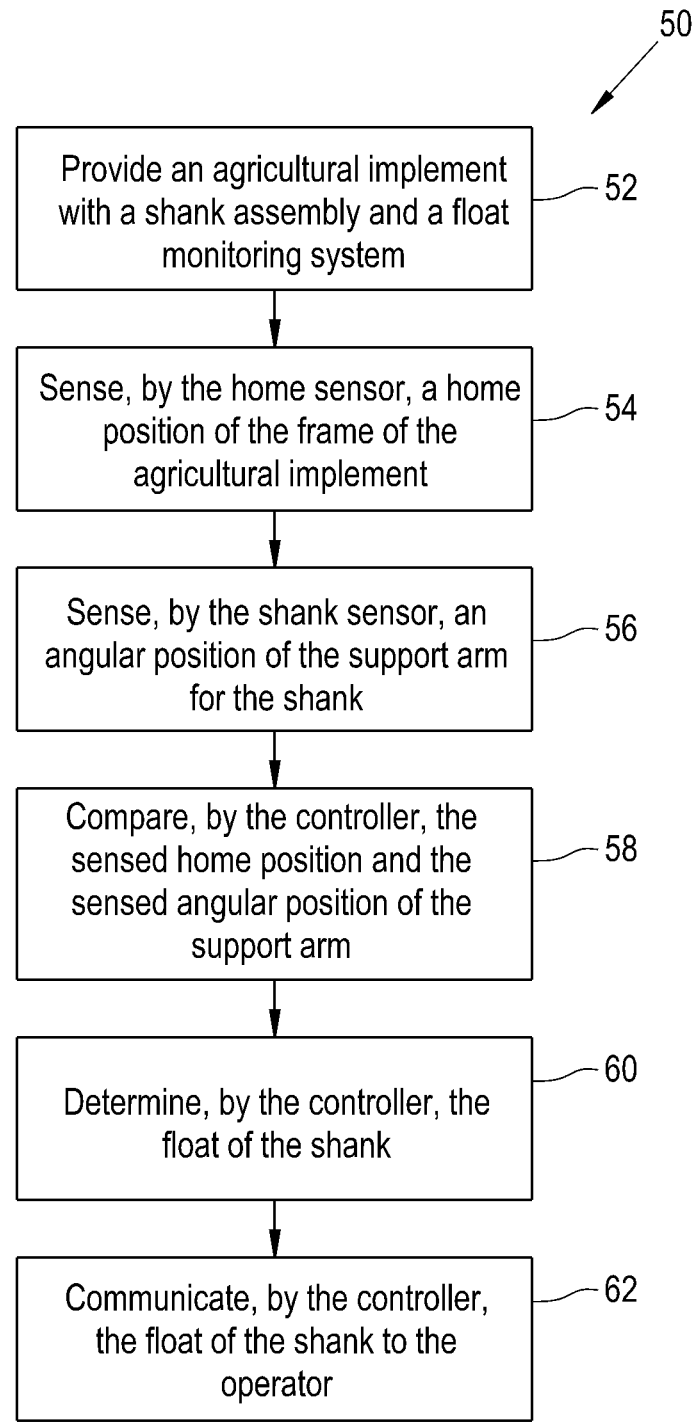
FIG. 4 illustrates a flowchart of a method for operating the float monitoring system, in accordance with an exemplary embodiment of the present invention.

Referring now to FIG. 4, there is shown a flowchart of a method 50 for operating the agricultural implement 10, and more particularly, the float monitoring system 34 for monitoring the float of the shank assemblies 16. The method 50 may include an initial step of providing the shank assembly 16 and the float monitoring system 34, as discussed above (at block 52). The method may include a step of sensing the home position of the frame 12 by the home sensor 36 (at block 54). Next, the method may include sensing the angular position of the support arm 20 by the shank sensor 38 (at block 56). The controller 40 may then compare the sensed positions of the frame 12 and the support arm 20 (at block 58). For instance, the controller 40 may compare the starting positions of the frame 12 and support arm 20, store this first angular relationship, and subsequently compare a new, second angular relationship between the sensed positions of the frame 12 and support arm 20. Thereafter, the controller 40 may determine the float of one or more shanks 24 by extrapolating a depth of each respective shank 24 from the angular position of the support arm 20 relative to the home position sensed by the home sensor 36 (at block 60). Next, the method 50 may include a step of communicating the float of each respective shank 24 to the operator of the agricultural tillage implement 10 (at block 62). For example, the controller 40 may communicate a float signal to an indicator, e.g. warning light and/or user interface within the towing vehicle, for alerting the operator that the shanks 24 have floated out of their desired depth position.

It is to be understood that the steps of the method 50 are performed by the controller 40 upon loading and executing software code or instructions which are tangibly stored on the tangible computer readable medium 42, such as on a magnetic medium, e.g., a computer hard drive, an optical medium, e.g., an optical disc, solid-state memory, e.g., flash memory, or other storage media known in the art. Thus, any of the functionality performed by the controller 40 described herein, such as the method 50, is implemented in software code or instructions which are tangibly stored on a tangible computer readable medium. The controller 40 loads the software code or instructions via a direct interface with the computer readable medium or via a wired and/or wireless network. Upon loading and executing such software code or instructions by the controller 40, the controller 40 may perform any of the functionality of the controller 40 described herein, including any steps of the method 50 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

According to another aspect of the exemplary embodiment of the present invention, the float monitoring system 34 may be an aftermarket system, for example, installed after the manufacture of the agricultural implement 10. In this regard, the float monitoring system 34 may be sold separately from the agricultural implement 10. Thereby, the float monitoring system 34 may be a separate unit which is installed and subsequently integrated into the existing hardware and/or software of the agricultural implement 10 and/or towing vehicle.

It is conceivable that the float monitoring system 34 may not include a home sensor 36. In this regard, controller 40 may determine the incline of the support arm 20 only by using the incline sensor readings of the shank sensor 38. The controller 40 may include a reset function wherein a desired operating depth of the shanks 24 is set to be the relative home, e.g. zero, angular position from which the change of further rotation is subsequently compared. For example, after setting a desired depth for the agricultural tillage implement 10 and/or shanks 24, the operator may input a user command to the controller 40, via a user interface, which resets the home angular position of the respective support arm 20.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A shank assembly for an agricultural tillage implement comprising a frame, comprising:
   a support arm comprising a first end and a second end, the first end being configured for pivotally connecting to the frame;
   a shank comprising a first end and a second end, the first end of the shank being connected to the second end of the support arm;
   a point connected to the second end of the shank and configured for engaging with soil; and
   a float monitoring system, comprising:
   a first sensor configured for being connected to the frame and sensing a home position;
   a second sensor connected to the support arm and configured for sensing an angular position of the support arm relative to the frame; and
   an electronic control unit operably connected to the first sensor and the second sensor and configured for comparing the home position and the angular position of the support arm and determining a float of the shank as the shank is towed in a forward direction of travel; and
   wherein the second end of the support arm comprises a bracket which mounts the shank to the support arm, and the second sensor is mounted on the bracket of the support arm, and wherein the shank assembly further comprises a spring mounting bracket connected to the bracket of the support arm at a first location by at least one fastener and a spring connected to the spring mounting bracket.

2. The shank assembly of claim 1, wherein the electronic control unit is configured for determining the float of the shank by extrapolating a depth of the shank from the angular position of the support arm relative to the home position.

3. The shank assembly of claim 1, wherein the first sensor and the second sensor are respectively in the form of a first inclinometer sensor and a second inclinometer sensor.

4. The shank assembly of claim 3, wherein the first inclinometer sensor and the second inclinometer sensor are each in the form of an electronic inclinometer sensor.

5. The shank assembly of claim 1, further comprising a plate connected to the bracket of the support arm at the first location by the at least one fastener which connects the spring mounting bracket to the bracket of the support arm, and wherein the second sensor is mounted onto the plate such that the plate mounts the second sensor onto the bracket of the support arm.

6. The shank assembly of claim 1, wherein the electronic control unit is further configured for alerting an operator of the agricultural tillage implement of the float of the shank.

7. An agricultural tillage implement for an agricultural vehicle, comprising:
   a frame;
   at least one shank assembly connected to the frame, each shank assembly comprising:
   a support arm comprising a first end and a second end, the first end being pivotally connected to the frame;
   a shank comprising a first end and a second end, the first end of the shank being connected to the second end of the support arm; and
   a point connected to the second end of the shank and configured for engaging with soil; and
   a float monitoring system, comprising:
   a first sensor connected to the frame and configured for sensing a home position;
   a second sensor connected to the support arm of the at least one shank assembly and configured for sensing an angular position of the support arm relative to the frame; and
   an electronic control unit operably connected to the first sensor and the second sensor and configured for comparing the home position and the angular position of the support arm and determining a float of the shank as the shank is towed in a forward direction of travel; and wherein the second end of the support arm comprises a bracket which mounts the shank to the support arm, and the second sensor is mounted on the bracket of the support arm, and wherein the agriculture tillage implement further comprises a spring mounting bracket connected to the bracket of the support arm at a first location by at least one fastener and a spring connected to the spring mounting bracket.

8. The agricultural tillage implement of claim 7, wherein the electronic control unit is configured for determining the float of the shank by extrapolating a depth of the shank from the angular position of the support arm relative to the home position.

9. The agricultural tillage implement of claim 7, wherein the first sensor and the second sensor are respectively in the form of a first inclinometer sensor and a second inclinometer sensor.

10. The agricultural tillage implement of claim 9, wherein the first inclinometer sensor and the second inclinometer sensor are each in the form of an electronic inclinometer sensor.

11. The agricultural tillage implement of claim 7, further comprising a plate connected to the bracket of the support arm at the first location by the at least one fastener which connects the spring mounting bracket to the bracket of the support arm, and wherein the second sensor is mounted onto the plate such that the plate mounts the second sensor onto the bracket of the support arm.

12. The agricultural tillage implement of claim 7, wherein the electronic control unit is further configured for alerting an operator of the agricultural tillage implement of the float of the shank.

13. The agricultural tillage implement of claim 7, wherein the at least one shank assembly comprises a plurality of shank assemblies respectively mounted to the frame, and the float monitoring system comprises a respective second sensor connected to each support arm of the plurality of shank assemblies.

14. A method of operating an agricultural tillage implement comprising a frame, comprising:
providing a shank assembly for the agricultural tillage implement, the shank assembly comprising a support arm comprising a first end and a second end, the first end being configured for pivotally connecting to the frame, a shank comprising a first end and a second end, the first end of the shank being connected to the second end of the support arm, a point connected to the second end of the shank and configured for engaging with soil, and a float monitoring system, the float monitoring system comprising a first sensor configured for being connected to the frame, a second sensor connected to the support arm, and an electronic control unit operably connected to the first sensor and the second sensor; wherein the second end of the support arm comprises a bracket for mounting the shank to the support arm, and the second sensor is mounted on the bracket of the support arm, and wherein the agriculture tillage implement further comprises a spring mounting bracket connected to the bracket of the support arm at a first location by at least one fastener and a spring connected to the spring mounting bracket,
sensing, by the first sensor, a home position of the frame;
sensing, by the second sensor, an angular position of the support arm relative to the frame;
comparing, by the electronic control unit, the home position and the angular position of the support arm; and
determining, by the electronic control unit, a float of the shank as the shank is towed in a forward direction of travel.

15. The method of claim 14, wherein the step of determining the float of the shank comprises extrapolating, by the electronic control unit, a depth of the shank from the angular position of the support arm relative to the home position.

16. The method of claim 14, further comprising a step of alerting, by the electronic control unit, an operator of the agricultural tillage implement of the float of the shank.

* * * * *